United States Patent
Furcoiu

(10) Patent No.: US 9,441,720 B2
(45) Date of Patent: Sep. 13, 2016

(54) TORQUE CONVERTER WITH DIVIDER AND STATOR CLUTCH

(71) Applicant: Caterpillar Inc., Peoria, IL (US)

(72) Inventor: Aurelian Ioan Furcoiu, East Peoria, IL (US)

(73) Assignee: Caterpillar Inc., Peoria, IL (US)

(*) Notice: Subject to any disclaimer, the term of this patent is extended or adjusted under 35 U.S.C. 154(b) by 111 days.

(21) Appl. No.: 14/560,970

(22) Filed: Dec. 4, 2014

(65) Prior Publication Data

US 2016/0160979 A1    Jun. 9, 2016

(51) Int. Cl.
*F16H 47/08* (2006.01)
*F16H 45/02* (2006.01)

(52) U.S. Cl.
CPC ............. *F16H 47/08* (2013.01); *F16H 45/02* (2013.01); *F16H 47/085* (2013.01)

(58) Field of Classification Search
USPC .......................................................... 475/59
See application file for complete search history.

(56) References Cited

U.S. PATENT DOCUMENTS

| | | | |
|---|---|---|---|
| 3,354,746 A | 11/1967 | Paredes | |
| 4,018,106 A * | 4/1977 | Uozumi | F16H 3/663 475/47 |
| 4,398,436 A | 8/1983 | Fisher | |
| 5,557,977 A * | 9/1996 | Stockton | B60K 17/28 475/47 |
| 5,857,934 A | 1/1999 | Ohkubo | |
| 7,081,068 B2 * | 7/2006 | Nakagawa | B60W 10/06 477/132 |
| 7,874,953 B2 | 1/2011 | Shamie et al. | |
| 7,955,207 B2 | 6/2011 | Wang et al. | |
| 8,608,604 B1 | 12/2013 | Jawalkar Nagaraj et al. | |
| 2008/0119316 A1 | 5/2008 | Ordo | |
| 2014/0113767 A1 | 4/2014 | Jawalkar Nagaraj et al. | |

OTHER PUBLICATIONS

U.S. Appl. No. 14/154,877, entitled, "Lock Up Clutch (LUC) Controls—Engine Control When LUC Changes State," filed Jan. 14, 2014 (28 pages).
U.S. Appl. No. 14/152,260, entitled "Method and Controller for a Power Train in a Machine," filed Jan. 10, 2014 (28 pages).

* cited by examiner

*Primary Examiner* — Ramya Burgess
*Assistant Examiner* — Timothy M Hannon
(74) *Attorney, Agent, or Firm* — Miller, Matthias & Hull LLP

(57) ABSTRACT

A torque converter and torque divider assembly may receive torque from a power source and input the torque to a torque converter including an impeller, a turbine, and a stator, and a torque divider including a planetary gear system. The torque divider may also receive torque output from the turbine of the torque converter, and may output torque to a device such as a transmission. The torque converter and torque divider assembly may further include a stator clutch that is controlled to selectively lock the stator in place, and a lock-up clutch controlled to selectively lock rotating components of the torque converter and torque divider assembly, such as the impeller and the turbine of the torque converter.

20 Claims, 4 Drawing Sheets

TORQUE CONVERTER WITH DIVIDER AND STATOR CLUTCH

TECHNICAL FIELD

The present disclosure relates generally to torque converters in vehicle and machine transmissions and, more particularly, to a torque converter integrated with a torque divider, a controllable stator clutch and a controllable lock-up clutch.

BACKGROUND

Vehicles and mobile machines generally have a power source such as an internal combustion engine or electric motor, a transmission to transmit drive power to move the vehicle or machine, and a mechanism to selectively transfer rotational torque from the power source to the transmission. In some approaches, the mechanism to selectively transfer rotational torque from the power source to the transmission includes a manual clutch. Manual clutches are efficient. However, operation of manual clutches requires extra effort and added operational oversight by the vehicle operators. Such extra effort and added operational oversight can be less desirable as they can, for example, reduce the operators' efficiency.

An alternative mechanism for transferring rotational torque from the power source to the transmission is a torque converter. A torque converter is generally a hydrodynamic fluid coupling that transfers the rotational torque from a power source to a driven load such as a transmission. The torque converter multiplies the torque from the power source and transfers the torque to the transmission until a speed of an output shaft from the torque converter to the transmission approaches the speed of the shaft of the power source supplying the rotational torque. U.S. Pat. Appl. Publ. No. 2014/0113767 to Jawalkar Nagaraj et al. discloses a torque converter that includes a prime mover input and an impeller configured to rotate in response to the prime mover input. The torque converter further includes a turbine arranged with the impeller and configured to rotate in response to rotation of the impeller, a stator arranged with the impeller and the turbine, and a stator clutch configured to allow rotation of the stator in a first mode and configured to limit rotation of the stator in a second mode. The torque converter further includes a stator clutch actuator configured to activate and deactivate the stator clutch to place the stator clutch in the second mode during particular operations and to place the stator clutch in the first mode otherwise. The reference further discloses a vehicle and a process of converting torque for operation of a vehicle.

However, torque converters are typically less efficient and result in worse fuel economy due to hydraulic losses and the like in comparison to mechanical clutches. Additionally, torque converters in larger vehicle applications require a great deal of torque transfer that can exasperate these problems. Moreover, due to the increased torque requirements of larger vehicles, larger size torque converters are typically required, thereby increasing the cost of production and increasing the space required to house the torque converters and transmissions. Current torque converter designs can also cause excessive torques on the power sources in vehicles and machines that operate on graded surfaces. In view of this, opportunities exist for improvement in the efficiency, fuel economy, size and cost of torque converters, and for reductions the hydraulic losses that exist in torque converters.

SUMMARY OF THE DISCLOSURE

In one aspect of the present disclosure, a torque converter and torque divider assembly is disclosed. The torque converter and torque divider assembly may include a power source input shaft configured to receive a power source input torque from a power source, a torque converter including an impeller, a turbine, and a stator, and the torque converter may be configured to receive an impeller input torque and generate a turbine output torque, and a torque divider configured to receive the power source input torque and divide the power source input torque into at least a planetary system input torque and the impeller input torque. The torque converter and torque divider assembly may further include a planetary gear system configured to receive the planetary system input torque, with the planetary gear system including a sun gear, a ring gear, a planet gear, and a planet carrier coupled to the planet gear, a stator clutch configured to selectively be locked to limit rotation of the stator and to be unlocked to allow rotation of the stator, and a stator clutch actuator configured to activate and deactivate the stator clutch to lock the stator clutch during particular operations and to otherwise unlock the stator clutch. The torque converter and torque divider assembly may also include a lock-up clutch configured to lock rotating components of the torque converter and torque divider assembly, and an assembly output shaft.

In another aspect of the present disclosure, a process for dividing and converting torque for operation of a vehicle or machine is disclosed. The process may include receiving a power source input torque from a power source of the vehicle or machine, receiving an impeller input torque into a torque converter, the torque converter including an impeller, a stator, and a turbine, and dividing the power source input torque with a torque divider into at least a planetary system input torque and the impeller input torque, and receiving the planetary system input torque into a planetary gear system. The process may further include selectively locking the stator to prevent rotation of the stator during particular operations and otherwise allowing rotation of the stator, locking rotating components of at least one of the torque converter and the torque divider, and generating a torque output.

In a further aspect of the present disclosure, a torque converter and torque divider assembly are disclosed. The torque converter and torque divider assembly may include means for receiving a power source input torque from a power source, means for receiving an impeller input torque into a torque converter means, the torque converter means including an impeller means, a stator means, and a turbine means, and means for dividing the power source input torque into at least a planetary system input torque and the impeller input torque. The process may further include means for receiving the planetary system input torque into a planetary gear system, means for selectively locking the stator means to limit rotation of the stator means and unlocking the stator means to allow rotation of the stator means, means for locking rotating components of the torque converter and torque divider assembly, and means for generating a torque output.

Additional aspects are defined by the claims of this patent.

DETAILED DESCRIPTION

Figure 1:
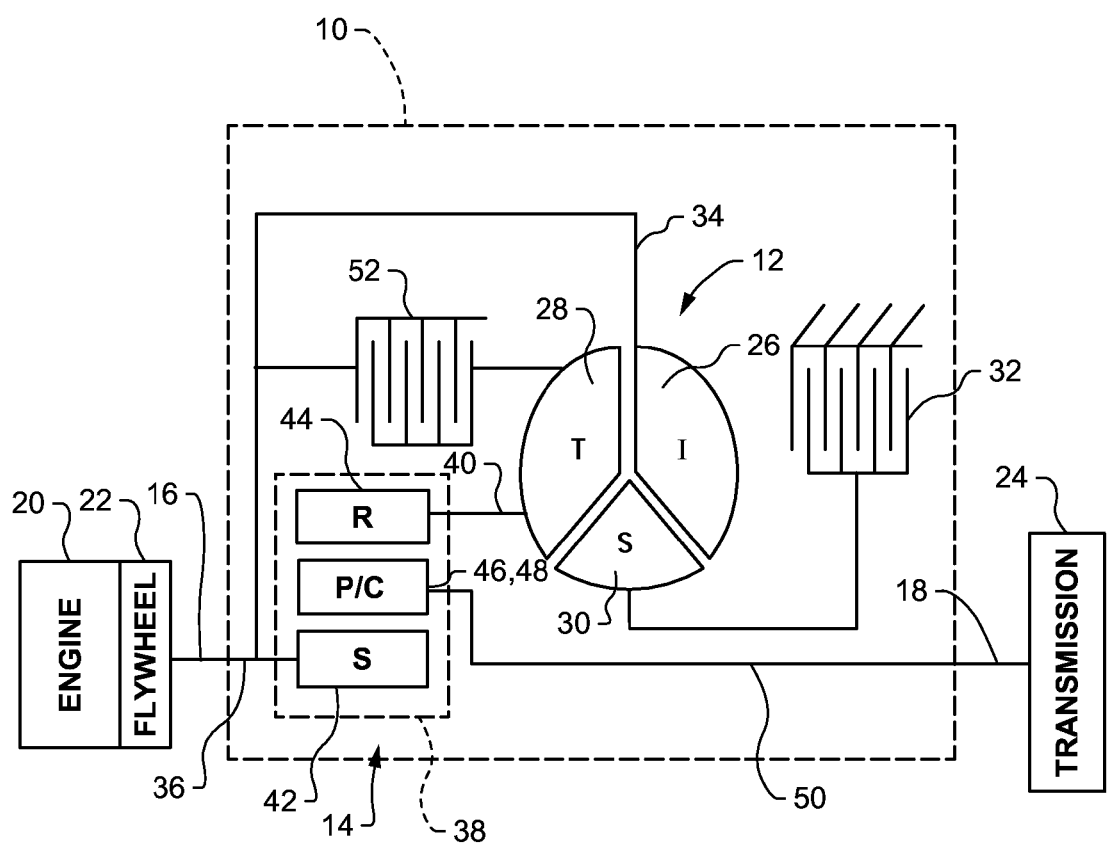
FIG. 1 is an schematic illustration of a torque converter and torque divider assembly in accordance with the present disclosure.

FIG. 1 shows a schematic of a torque converter and torque divider assembly 10 in accordance with the present disclosure. As shown in FIG. 1, the torque converter and torque divider assembly 10 includes a torque converter 12 and a torque divider 14 that may be interconnected and operate as described hereinafter. The torque converter and torque divider assembly 10 may further include a power source input shaft 16 and an assembly output shaft 18. The power source input shaft 16 may be directly connected to and extend from a power source of a vehicle or machine in which the assembly 10 is implemented, such as an engine 20, or may be indirectly connected to power source by a rotational energy storage device, such as a flywheel 22 as shown. Other arrangements for transferring power output by the power source to the power source input shaft 16 will be apparent to those skilled in the art. At an output end of the assembly 10, the assembly output shaft 18 may be directly or operatively connected to a transmission 24 of the vehicle or machine.

The torque converter 12 may be of a type commonly known in the art and may include an impeller 26, a turbine 28 and a stator 30. The impeller 26 may rotate as shown in the schematic of FIG. 1 in conjunction with and at the same speed as the power source input shaft 16. The rotation of the impeller 26 may generate a hydrodynamic fluid coupling within the torque converter 12 and accordingly rotate the turbine 28. The stator 30 may be interposed between the impeller 26 and the turbine 28, and may positively and efficiently alter the fluid flow between the impeller 26 and the turbine 28 when necessary during operation of the vehicle or machine.

In the embodiment shown in FIG. 1, the stator 30 is configured to rotate within the torque converter 12. The rotation of the stator 30 during operation may be controlled by a stator clutch 32 that can operate to limit the rotation of the stator 30 in response to the flow of the hydrodynamic fluid within the torque converter 12. More specifically, the stator clutch 32 may allow rotation of the stator 30 when not actuated, and may prevent rotation of the stator 30 when actuated by locking the stator 30 to a stationary component such as the transmission housing. The stator clutch 32 may be activated to engage the stator 30 during predetermined vehicle operating conditions where it is desirable to redirect the hydrodynamic fluid within the torque converter 12 as will be discussed further below. Such conditions may include operation of the vehicle when driving downgrade and during directional shifts where a retarding force on the hydrodynamic fluid may be desirable. Other operating conditions are contemplated as well wherein activation of the stator clutch 32 may improve performance of the torque converter 12.

The torque divider 14 operates to split the torque from the power source input shaft 16 between the torque converter 12 and the torque divider 14. In the embodiment shown in FIG. 1, the torque divider 14 splits the torque between an impeller input torque 34 that is delivered to the impeller 26 and a planetary system input torque 36 that is delivered to a planetary gear system 38 of the torque divider 14. The impeller input torque 34 causes the impeller 26 rotate within the torque converter 12, and the hydrodynamic coupling within the torque converter 12 causes the turbine 28 to rotate and generate a turbine output torque 40. The turbine output torque 40 may then be a second input torque for the planetary gear system 38.

The planetary gear system 38 may include a sun gear 42, a ring gear 44, and one or more planet gears 46 mounted on a planet carrier 48 for rotation about the sun gear 42. In the illustrated embodiment, the planetary system input torque 36 may drive the sun gear 42 of the planetary gear system 38, and the turbine 28 may be operatively connected to the ring gear 44 so that the turbine output torque 40 drive the ring gear 44. The combination of the planetary system input torque 36 and the turbine output torque 40 may cause the planet gears 46 and, correspondingly, the planet carrier 48 to rotate about the sun gear 42. The rotation of the planet carrier 48 may be used to produce a planetary system output torque 50 that is transmitted to the assembly output shaft 18 to drive the transmission 24 by operatively connecting the planet carrier 48 to the output shaft 18. While the torque divider 14 is disclosed as the planetary gear system 38 connected to the torque converter 12, the power source input shaft 16 and the assembly output shaft 18 as illustrated and described, other types of planetary gear sets and other torque divider systems are contemplated as well. Moreover, the torques 36, 40 may be input to the planetary gear system 38 and the torque 40 may be output from the planetary gear system 38 via varying connections to the gears 42, 44, 46 and the planet carrier 48 to achieve desired torque division and transfer between the engine 20 and the transmission 24.

In addition, FIG. 1 shows a lock-up clutch 52 that may be included if desired to lock one or more rotationally driven components of the torque converter and torque divider assembly 10. In the illustrated embodiment, the lock-up clutch 52 may be configured to selectively couple the impeller 26 and the turbine 28. The lock-up clutch 52 may be disengaged at times such as during acceleration of the vehicle where differential rotation between the impeller 26 and the turbine 28 is desirable. Conversely, the lock-up clutch 52 may be engaged to physically link the impeller 26 and the turbine 28 when they are rotating close to the same speed, such as when the vehicle is cruising at a constant speed, and thereby effectively changing the torque converter 12 into a purely mechanical coupling with no slippage and increased efficiency over hydraulic losses presented by the hydrodynamic coupling.

Figure 2:
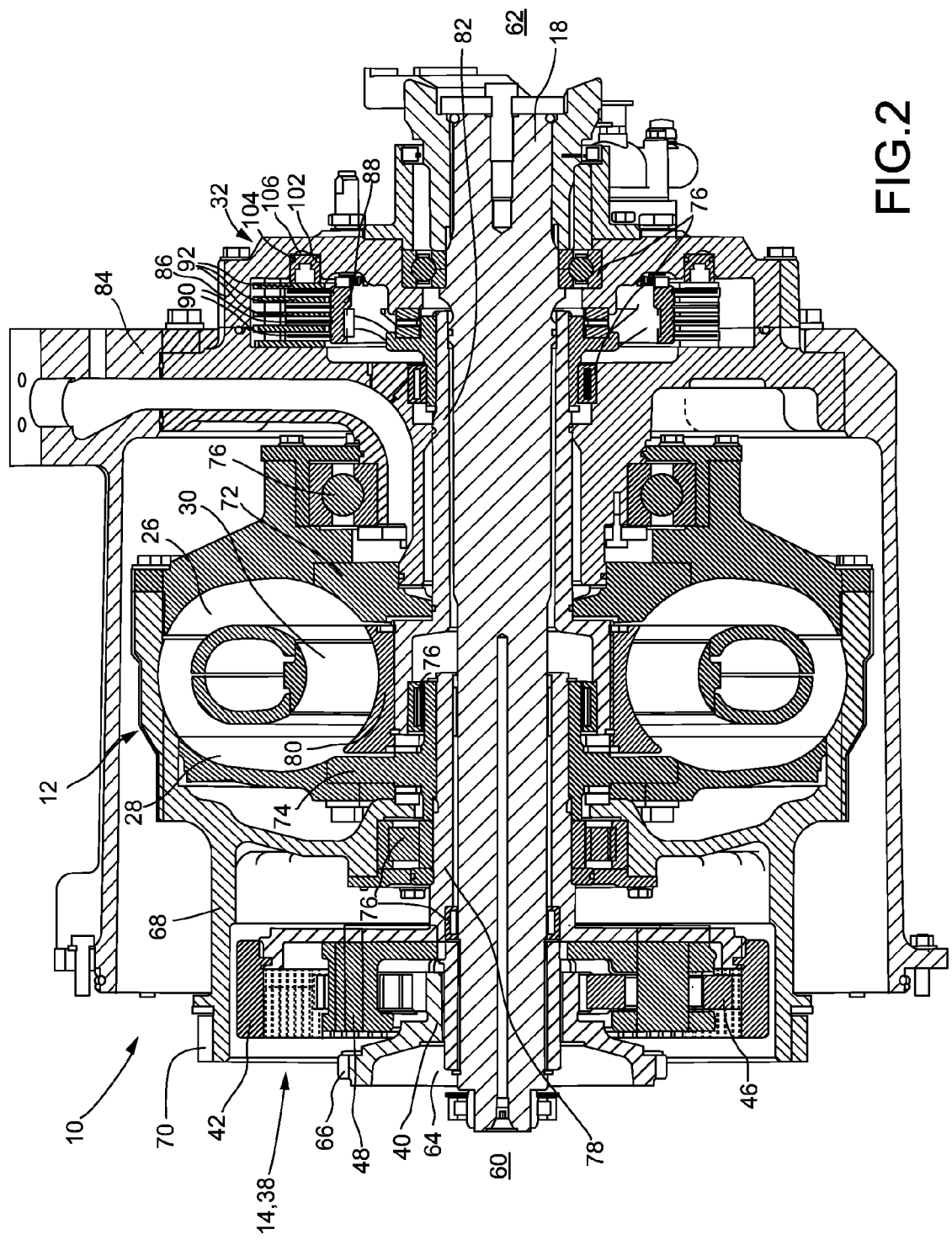
FIG. 2 is a cross-sectional view of an implementation of the torque converter and torque divider assembly of FIG. 1.

FIG. 2 is a cross-sectional view of an implementation of the torque converter and torque divider assembly 10 of FIG. 1 without the lock-up clutch 52. This particular implementation is exemplary and is one of many implementations that are consistent with the disclosure and the schematic of FIG. 1. As shown in FIG. 2, the flywheel 22 (not shown) may provide torque from a crankshaft (not shown) of the engine 20 at an input end 60 of the assembly 10, and the assembly output shaft 18 may connect to the transmission 24 (not shown) at an output end 62 of the assembly 10. At the input end 60, the sun gear 42 may be rotatable relative to the assembly output shaft 18 and the planet carrier 48. The sun gear 42 may include a torque divider input flange 64 having external sun gear splines 66 that may be engaged by a corresponding coupling mechanism of the flywheel 22. When the flywheel 22 rotates, the planetary gear system 38 receives the planetary system input torque 36 as the sun gear 42 rotates with the flywheel 22. The torque converter 12 may have a torque converter housing 68 that may also be rotatable relative to the assembly output shaft 18 and the planet carrier 48. The torque converter housing 68 may include external housing drive splines 70 that may be engaged by a corresponding coupling mechanism of the flywheel 22 to receive the impeller input torque 34 as the housing 68 rotates with the input shaft 16. In alternative embodiments, the power from the engine 20 may be transmitted by a drive shaft coupled to the torque converter 12 and the sun gear 42 depending on the particular configurations of the torque converter 12 and the torque divider 14.

The torque converter housing 68 transfers the impeller input torque 34 to the impeller 26. The impeller 26 is located within the torque converter 12 and may be arranged on an impeller hub 72 that is rotatable relative to the assembly output shaft 18. The turbine 28 is also arranged within the torque converter 12. Rotation of the impeller 26 due to the impeller input torque 34 may be hydrodynamically transferred from the impeller 26 to the turbine 28 and consequently may be transferred to a turbine hub 74 as the turbine output torque 40. The torque converter housing 68, hubs 72, 74 and other rotating components may be supported on bearings 76, such as roller bearings, thrust bearings, and the like, throughout the structure.

The turbine hub 74 may include a mechanical connection to a turbine output flange 78. The mechanical connection of the turbine hub 74 to the turbine output flange 78 may be any type of mechanical connection such as splines, a key and keyway, and the like. The turbine output flange 78 may also be operatively connected to the ring gear 44 to rotate the ring gear 44 and thereby communicate the turbine output torque 40 to the planetary gear system 38. Thus, the power source input shaft 16 rotates the torque converter housing 68, the impeller 26 and the impeller hub 72, the hydrostatic coupling between the impeller 26 and the turbine 28 rotates the turbine 28 and the turbine hub 74 resulting in the transfer of the turbine output torque 40 to the turbine output flange 78 and the ring gear 44 and, consequently, the planetary gear system 38.

Within the planetary gear system 38, the planet gears 46 are rotatably connected to the planet carrier 48 and mesh with the sun gear 42 and the ring gear 44. The planet carrier 48 is operatively connected to the assembly output shaft 18 so that the planet carrier 48 rotates the output shaft 18 with the planetary system output torque 50 when the planetary system input torque 36 rotates the sun gear 42 and/or the turbine output torque 40 rotates the ring gear 44. Thus, the torque that is divided between the torque converter 12 and the planetary gear system 38 is rejoined in planetary gear system 38 to create the output torque 50 that is provided to the transmission 24 to drive the vehicle or machine.

Under most operating conditions, the components of the torque converter 12 and the torque divider 14 and the output shaft 18 will rotate in the same direction as the input shaft 16. An exception occurs in the stopped or stalled condition when the brakes are applied and the transmission 24 locks the assembly output shaft 18 to prevent rotation. The input shaft 16 continues to rotate the impeller 26 and the sun gear 42, which in turn rotates the planet gears 46. The locked output shaft 18 prevents rotation of the planet carrier 48, so the rotation of the planet gears 46 causes the planet gear 48 and, correspondingly, the turbine 28 to rotate in the opposite direction. The rotation of the impeller 26 and the turbine 28 can result in hydraulic losses within the torque converter 12. However, the operational state of the stator 30 can be manipulated to minimize the hydraulic losses as discussed further below.

The stator 30 may be interposed between the impeller 26 and the turbine 28 within the torque converter 12 to positively and efficiently alter the fluid flow between the impeller 26 and the turbine 28. The stator 30 may be mounted on a stator hub 80 that may allow rotation of the stator 30 about the assembly output shaft 18 and independent of the rotations of the impeller 26 and the turbine 28. The stator hub 80 may be operatively connected to a stator carrier 82 that extends along the output shaft 18 under a portion of a transmission housing 84 that encloses the torque converter and torque divider assembly 10. Rotation of the stator 30 results in rotation of the stator hub 80 and the stator carrier 82. Conversely, limiting rotation of the stator carrier 82 will limit rotation of the stator hub 80 and the stator 30.

The stator carrier 82 may function to operatively connect the stator clutch 32 with the stator hub 80 and the stator 30. At the same time, the stator clutch 32 may be operatively connected in part with the transmission housing 84 through a clutch housing 86. Accordingly, the stator clutch 32 selectively links the transmission housing 84 with the stator hub 80 to limit movement there between based on the operating conditions in and around the assembly 10. More specifically, the stator clutch 32, when activated, limits movement of the stator hub 80 and accordingly limits movement of the stator 30. The stator clutch 32 may be activated during predetermined vehicle operations. The predetermined vehicle operations may include acceleration of the vehicle where the stator 30 functions as a torque multiplier, and driving downhill and performing directional shifts where the stator 30 performs a hydraulic retarding function. Activation of the stator clutch 32 during these predetermined vehicle operations may improve performance of the torque converter 12.

Figure 3:
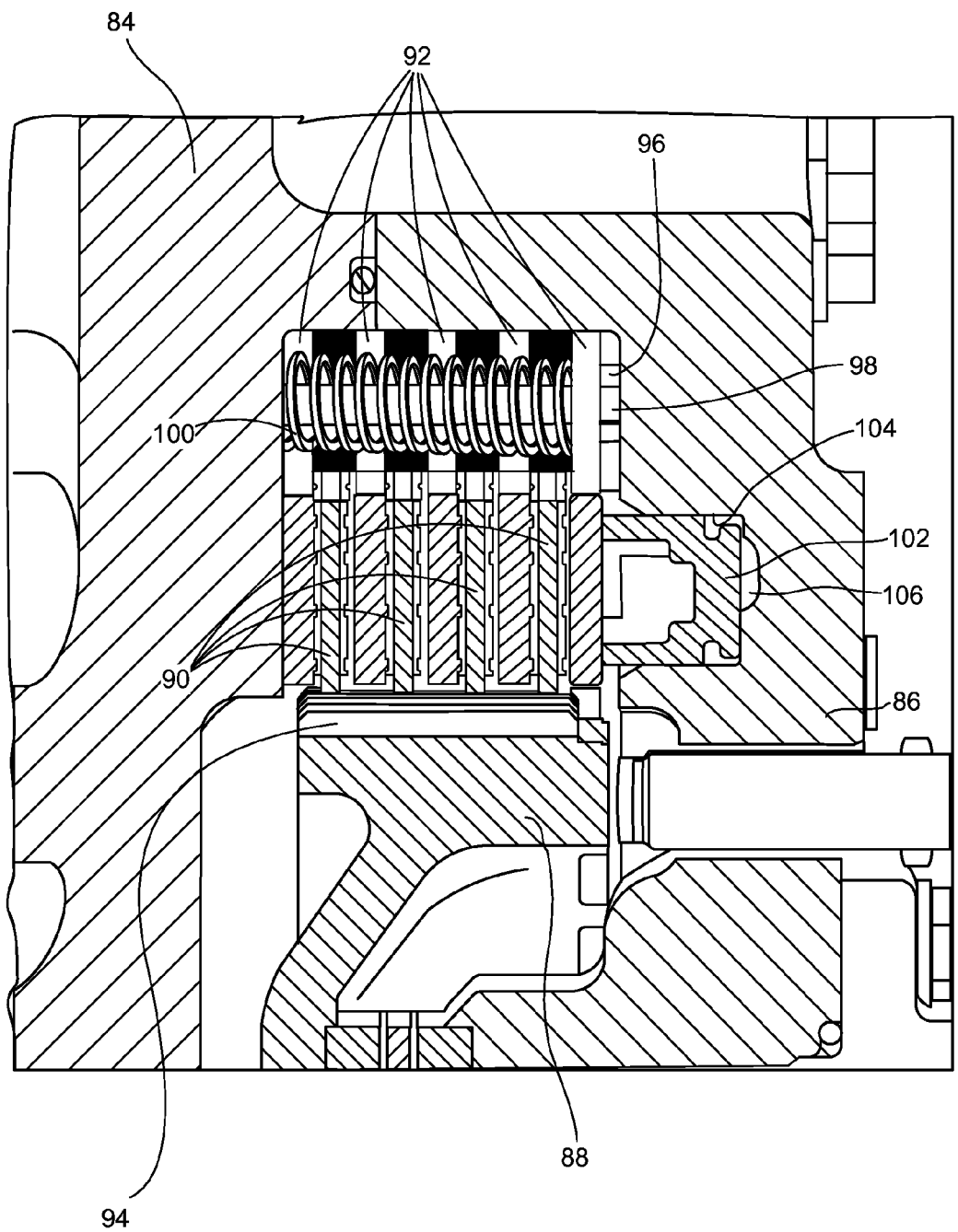
FIG. 3 is an enlarged cross-sectional view of the stator clutch of the torque converter and torque divider assembly of FIG. 2.

In the illustrated embodiment, the stator clutch 32 may include a stator clutch hub 88 operatively connected the stator carrier 82 for rotation with the stator 30 and the stator hub 80. The stator clutch 32 may further include one or more friction discs 90 arranged therein alternately with a corresponding plurality of clutch plates 92. The illustrated arrangement of the stator clutch 32 is shown in greater detail in the enlarged view of FIG. 3. The friction discs 90 may operatively connected to the stator clutch hub 88 for rotation therewith, while the clutch plates 92 may be mounted within the clutch housing 86 so that the clutch plates 92 do not rotate about the output shaft 18. The stator clutch hub 88 may include external drive splines 94 circumferentially spaced about and outer surface of the stator clutch hub, and the friction discs 90 may have corresponding internal splines (not shown). The drive splines 94 may engage the friction discs 90 to rotate the friction discs 90 when the stator 30 rotates while also allowing the friction discs 90 to slide onto the stator clutch hub 88 and to move axially relative to the stator clutch hub 88 after assembly.

The clutch plates 92 may also be installed with the ability to move axially relative to the stator clutch hub 88 and the output shaft 18. The clutch plates 92 may be mounted within the cavity between the transmission housing 84 and the stator clutch housing 86 by a plurality of clutch plate dowels 96 that may be essentially circumferentially spaced about the cavity and extend between the housings 84, 86. During installation with the stator clutch hub 88 and the clutch plate dowels 96 in place and before the stator clutch housing 86 is installed, the friction discs 90 and the clutch plates 92 may be installed by alternately sliding one of the clutch plates 92 onto the dowels 96 then sliding one of the friction discs 90 onto the stator clutch hub 88 with the drive splines 94 meshing with the inward splines of the friction discs 90. Before a final clutch plate 92 is installed, a plurality of circumferentially spaced spring rods 98 encircled by corresponding springs 100 may be inserted into corresponding bores (not shown) in the transmission housing 84. The final or outermost clutch plate 92 may then be slid onto the clutch plate dowels 96 and the spring rods 98 with the springs 100 compressed between the transmission housing 84 and the outermost clutch plate 92 to bias the clutch plate 92 away from the friction discs 90 when the stator clutch housing 86 is installed.

The stator clutch 32 may be activated by operation of a clutch piston 102. The clutch piston 102 may be slidable within a piston pocket 104 of the stator clutch housing 86, and may be engaged by an outward side of the outermost clutch plate 92 due to the biasing force of the springs 100. The clutch piston 102 may be hydraulically activated or deactivated in response to an application of pressurized hydraulic fluid from a source of pressurized hydraulic fluid (not shown) applied within an activation fluid cavity 106 positioned opposite the friction discs 90 and the clutch plates 92. The pressurized hydraulic fluid may be selectively supplied to and relieved from the activation fluid cavity 106 by a clutch pressure control valve (not shown) of the type commonly known in the art and in fluid communication between the activation fluid cavity 106 and the pressurized hydraulic fluid source.

When the clutch piston 102 is in the non-activated position as shown and the hydraulic fluid is not provided to the activation fluid cavity 106, the springs 100 bias the outward clutch plate 92 to an outward most position and allow for a maximum amount of spacing between the friction discs 90 and the clutch plates 92. When the hydraulic fluid is provided to the activation fluid cavity 106, the clutch piston 102 extends toward a clutch activated position against the biasing forces of the springs 100 to press the friction discs 90 and the clutch plates 92 against one another such that they no longer freely rotate with respect to one another. With this configuration, should the stator clutch 32 fail, the stator 30 will fail in the non-activated position and allow the stator 30 to rotate freely. In alternative embodiments, the stator clutch 32 may be reconfigured so that the direction of application of the forces of the springs 100 and the clutch piston 102 may be reversed so that the springs 100 bias the friction discs 90 and the clutch plates 92 together and the clutch piston 102 forces the friction discs 90 and the clutch plates 92 apart when the pressurized hydraulic fluid is supplied to unlock the stator clutch 32. With this configuration, the stator clutch 32 will fail in the locked position and the stator 30 will not rotate.

Returning to FIG. 2, the illustrated embodiment of the torque converter and torque divider assembly 10 does not include the lock-up clutch 52 shown in the schematic diagram of FIG. 1. However, as discussed above, it is contemplated by the inventor that the lock-up clutch 52 may be provided to selectively apply a mechanical coupling between the impeller 26 and the turbine 28 for rotation in unison. One example of such a lock-up clutch mechanism is provided in U.S. Pat. No. 8,608,604 to Jawalkar Nagaraj et al., the disclosure of which is expressly incorporated by reference herein in its entirety. The Jawalkar Nagaraj et al. discloses a lock-up clutch mechanism having friction discs rotating with either the impeller or the turbine, and clutch plates rotating with the other of the impeller and the turbine. The lock-up clutch is activated by a clutch pressure control valve and a lock-up clutch piston that can force the friction discs and clutch plates together to lock the turbine to the impeller. This type of lock-up clutch is exemplary, however, and those skilled in the art will understand that other lock-up clutch mechanisms that may override a hydrodynamic fluid coupling with a mechanical coupling between the impeller and the turbine, and such mechanisms are contemplated by the inventor as having use in the torque converter and torque divider assembly 10 in accordance with the present disclosure.

Figure 4:
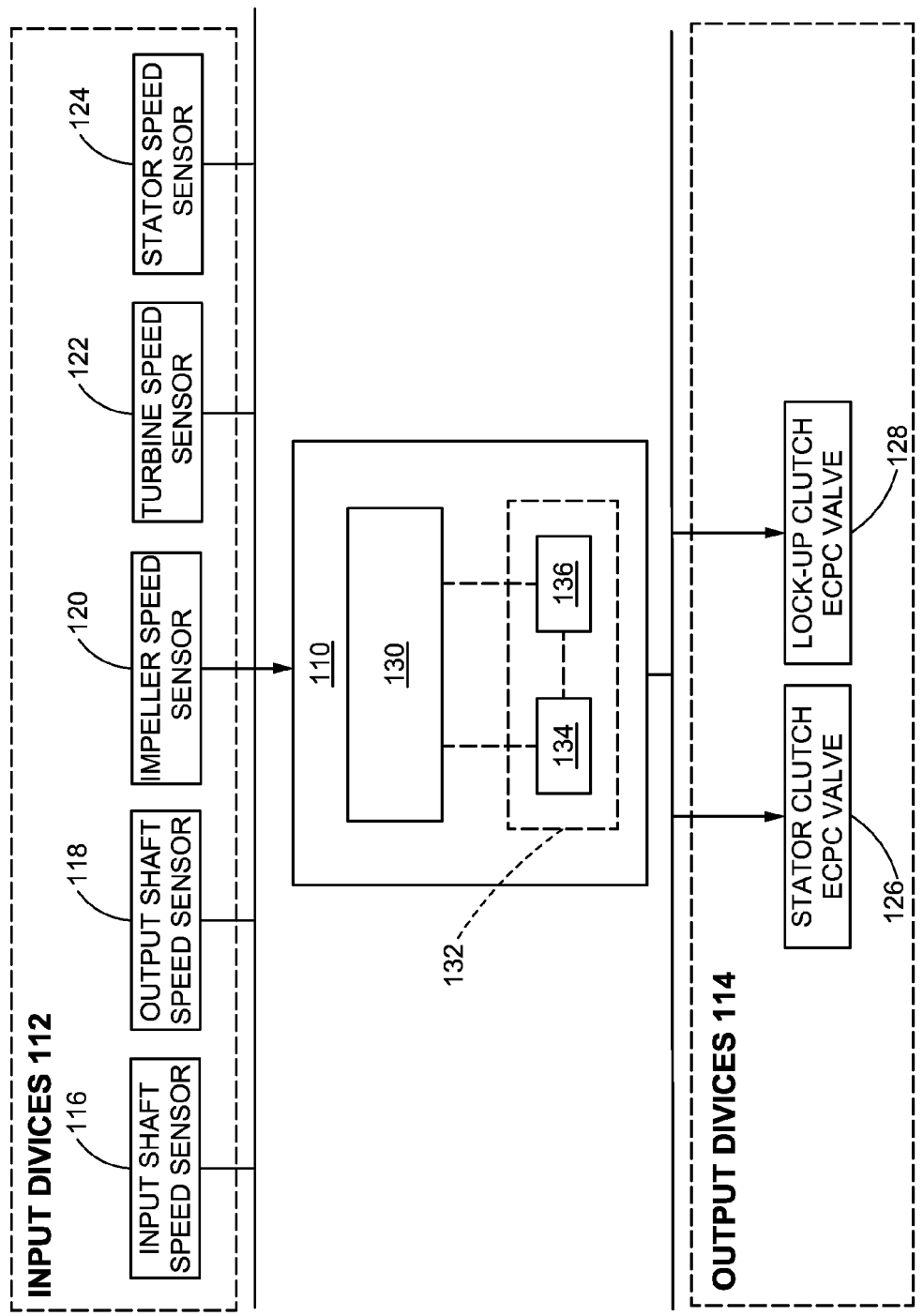
FIG. 4 is a schematic illustration of an electronic control module and input and output devices providing monitoring and control of the torque converter and torque divider assembly of FIG. 1 in a vehicle or machine in which the assembly is implemented.

The operation of the stator clutch 32 and the lock-up clutch 52 may be controlled by an appropriate control mechanism to execute appropriate control strategies. As shown in FIG. 4, an electronic control module (ECM) 110 of the vehicle or machine in which the assembly is implemented may be connected to the various input devices 112 and output device 114 of the vehicle or machine to monitor and control the performance of the assembly 10, the engine 20 and the transmission 24, as well as other systems of the vehicle or machine. The input devices 112 may include sensors providing information about the current operational state of the vehicle or machine. Within the assembly 10, such input devices may include speed, torque and position sensors transmitting signals corresponding to the rotational speeds, loads on and angular positions of the various rotating components of the assembly 10. Consequently, the ECM 110 may be operatively connected to an engine speed sensor 116, an output shaft speed sensor 118, an impeller speed sensor 120, a turbine speed sensor 122 and a stator speed sensor 124, among other sensing devices. The impeller speed is typically equal to the engine speed, so it may not be necessary to include both sensors 116, 120 in a particular implementation. In addition, the ECM 110 may be operatively connected to and receive signals from operator command input devices such as steering wheels, accelerator and brake pedals, gear shift levers, joysticks, graphical user interfaces and other types of user input devices to receive control signals indicating operator commands for operation of the vehicle or machine. Such input devices are well known in the art and therefore a detailed description of the sensors is not included herein.

The ECM 110 may also be operatively connected to the output devices 114 that may be the operational and controllable elements of the vehicle of machine. The output devices 114 may include, for example, a stator clutch electronic clutch pressure control (ECPC) valve 126 and a lock-up clutch ECPC valve 128 that control the locking and unlocking of the stator clutch 32 and the lock-up clutch 52, respectively. The ECPC valves 126, 128 are exemplary only, and the stator clutch 32 and lock-up clutch 52 may be controlled by other valves such as ON/OFF valves, or any other appropriate stator clutch actuator mechanisms. The output devices 114 may further include devices that can control the operation of other components and systems of the vehicle or machine, such as fuel injectors of the engine 20 that control the engine speed, clutches controlling the gear ratio produced by the transmission 24, and the like. In this regard, it is known to include driver circuitry or software within the ECM 110 for delivering control signals to the controlled output devices 114 that will cause the output devices 114 to operate according to a control strategy executed by the ECM 110. However, it is recognized that such driver circuitry could be implemented separate from, but connected to, the ECM 110.

FIG. 4 illustrates one exemplary configuration of the ECM 110 that may be implemented in the vehicle or machine to control the operation of the assembly 10 and other systems. The ECM 110 may include a microprocessor 130 for executing specified programs that control and monitor various functions associated with the vehicle or machine. The microprocessor 130 includes a memory 132, such as read only memory (ROM) 134, for storing a program or programs, and a random access memory (RAM) 136 which serves as a working memory area for use in executing the program(s) stored in the memory 132. Although the microprocessor 130 is shown, it is also possible and contemplated to use other electronic components such as a microcontroller, an ASIC (application specific integrated circuit) chip, or any other integrated circuit device. Moreover, although a single ECM 110 is shown, the vehicle or machine may include multiple ECM's 110 with the monitoring and control functions being distributed between the ECMs 110.

INDUSTRIAL APPLICABILITY

The operation of the torque converter and torque divider assembly 10 employing the stator clutch 32 and the lock-up clutch 52 in conjunction with the torque divider 14 and the torque converter 12 can realize greater efficiency, improved fuel economy, and reduced hydraulic losses. Moreover, a torque converter 12 having a torque divider 14 with a stator clutch 32 and a lock-up clutch 52 as illustrated and described may reduce the overall size of the assembly 10 and also reduce production cost.

Improved machine fuel efficiency is achieved by adding the stator clutch 32 with the ability through the ECM 110 to read the relative speeds associated with the assembly 10 and optimally lock and unlock the stator 30. During acceleration of the vehicle of machine, the power source input shaft 16 and the impeller 26 rotate at a much higher rate than the turbine 28 and the assembly output shaft 18 as the vehicle speed increases. Locking the stator 30 in place allows the stator 30 to provide torque multiplication within the torque converter 12 by redirecting the hydrodynamic fluid returning from the turbine 28 to the impeller 26 as is known in the art.

The ECM 110 determines that acceleration is occurring based on signals received from the input devices 112 such as the sensors 116-124, an accelerator pedal in an operator station, and the like. For example, the ECM 110 may compare a measure of the output speed of the assembly 10 or the torque converter 12 to a measure of a corresponding input speed. In one implementation, a torque converter speed ratio (TCR) may be calculated by the ECM 110 by dividing a turbine speed (torque converter output) determined from the signals from the turbine speed sensor 122 by an impeller speed (torque converter input) determined from the signals from the impeller speed sensor 120. When the ECM 110 determines the TCR is less than a predetermined acceleration stator lock maximum value, the ECM 110 may transmit control signals to the stator clutch ECPC valve 126 to actuate the valve 126 and lock the stator 30 to provide the desired torque multiplication during acceleration. To further improve efficiency, the ECM 110 may further determine whether the engine 20 is running and/or the impeller speed is greater than zero, i.e., the power source input shaft 16 and the impeller 26 are rotating to drive the turbine 28, before actuating the stator clutch ECPC valve 126 when the engine 20 is not outputting torque to the power source input shaft 16.

When the turbine speed approaches the impeller speed, the stator 30 no longer multiplies the torque within the torque converter 12, and instead creates resistance to the hydrostatic fluid returning to the turbine 28 from the impeller 26. As the turbine speed approaches the impeller speed, the ECM 110 may determine that the TCR is greater than the acceleration stator lock maximum value, and respond by transmitting control signals to the stator clutch ECPC valve 126 to deactivate the valve 126 and unlock the stator 30. Free rotation of the stator 30 allows the hydrostatic fluid to flow freely between the turbine 28 and the impeller 26. In one example, the acceleration stator lock maximum value for the TCR may be 0.9 so that the ECM 110 causes the stator clutch ECPC valve 126 to lock the stator 30 when the TCR is less than 0.9, and causes the valve 126 to unlock the stator 30 when the TCR is greater than or equal to 0.9.

Just as the stator 30 is used to redirect flow and provide torque multiplication when the turbine 28 is rotating slower than the impeller 26, the stator 30 may also redirect flow within the torque converter 12 and provide a retarding force against rotation of the turbine 28 when the turbine 28 is rotating faster than the impeller 26, i.e., the TCR is greater than 1.0. Such retarding forces may be desirable during engine braking or when the vehicle or machine travels downhill or downgrade and the vehicle speed is greater than that typically produced by a current engine speed. To react to these conditions, the ECM 110 may be programmed to determine when the TCR is greater than a retarding stator lock minimum value, and to respond by transmitting control signals to the stator clutch ECPC valve 126 to actuate the valve 126 to lock the stator 30 and provide a retarding force within the torque converter 12 to slow the turbine speed. When the ECM 110 determines that the TCR is reduced to a value less than the retarding stator lock minimum value, the ECM 110 may respond by transmitting control signals to the stator clutch ECPC valve 126 to deactivate the valve 126 and unlock the stator 30. Continuing the example from above, the retarding stator lock minimum value for the TCR may be 1.133 so that the ECM 110 causes the stator clutch ECPC valve 126 to lock the stator 30 when the TCR is greater than or equal to 1.133, and causes the valve 126 to unlock the stator 30 when the TCR is less than 1.133. Configured in this way, the stator clutch 32 will be actuated to lock the stator 30 when the TCR is either less than the acceleration stator lock maximum value or greater than the retarding stator lock minimum value, and will be deactivated to allow free rotation of the stator 30 when the TCR is between the acceleration stator lock maximum value and the retarding stator lock minimum value.

The TCR is an exemplary parameter for controlling the processing of the ECM 110 and the operation of the stator clutch 32. Those skilled in the art will understand that other parameters may be used to determine when to lock and unlock the stator 30 to provide torque multiplication or retarding at appropriate times. For example, a torque assembly speed ratio (TAR) may be used as an alternative speed ratio to the TCR and calculated by the ECM 110 by dividing an assembly output shaft speed (torque assembly output) determined from the signals from the output shaft speed sensor 118 by a power source input shaft speed (torque assembly input) determined from the signals from the engine speed sensor 116. Similar values for the acceleration stator lock maximum value and the retarding stator lock minimum value may be used with the TAR, or the values may be adjusted as necessary to reflect the actual operating conditions when the stator clutch 32 should be locked and unlocked. For example, in the present implementation, a value of the TAR greater than 1.0 may be less than a corresponding of the TCR due to additional efficiency losses attributable to interposing the torque divider 14 between the input shaft 16 and the output shaft 18. Consequently, the retarding stator lock minimum value of 1.133 for the TCR in the foregoing example may correspond to a value of 1.1 for the TAR.

The use of other speed ratios providing a comparison of a value representing an output of the assembly 10 to a value representing an input to the assembly 10 are contemplated by the inventors. Moreover, parameters other than speed ratios may be used to replace, override or contribute to the use of speed ratios by the ECM 110 to lock and unlock the stator clutch 32. For example, ratios of output torque to input torque provided by appropriate torque sensors may be use. Input and output power, vehicle speed, vehicle acceleration, transmission operation and vehicle inclination may also be considered in the control logic executed by the ECM 110.

The lock-up clutch 52 is controlled by the ECM 110 to increase the efficiency of the torque converter 12 when the impeller 26 and the turbine 28 are rotating at close to the same speed. The reduce hydrodynamic fluid coupling of the torque converter 12 is essential for the implementation of an automatic transmission, but it also presents inherent losses because the turbine 28 will not rotate as fast as the impeller 26, even when the vehicle or machine is cruising at a constant feed. Due to the inefficiency in the torque converter 12, the TCR or TAR may approach but cannot reach a value of 1.0. The lock-up clutch 52 provides a more efficient mechanical coupling in place of the less efficient fluid coupling by locking the impeller 26 and turbine 28 together for rotation at the same speed when the components are already rotating at close to the same speed. The ECM 110 controls the lock-up clutch 52 by comparing the calculated TCR, for example, to a lock-up clutch locking minimum value, and transmitting control signals to the lock-up clutch ECPC valve 128 to actuate the valve 128 and lock the turbine 28 to the impeller 26. Once engaged, the ECM 110 will monitor the TCR or other parameters that may indicate operating conditions whereby the lock-up clutch 52 should unlock so that the impeller 26 and the turbine 28 can again rotate at different speeds, such as during acceleration or deceleration, while ascending or descending a grade, or when the output shaft 18 experiences an increase or decrease in torque. Such conditions may be determined based on signals from appropriate input devices 112 indicative of the corresponding operating conditions.

The combination of the stator clutch 32 and the lock-up clutch may provide significant improvements in efficiencies in the vehicles or machines in which the torque converter and torque divider assembly 10 in accordance with the present disclosure is implemented. In one implementation in a large track-type bulldozer, adding the stator clutch 32 with the ability to control the stator 30 provided by the ECM 110 is estimated to save approximately 6,380 gallons (approximately 2.415e+004 liters) of fuel per year on a machine that burns an average of 145,000 gallons (5.489e+005 liters) of fuel per year to yield a 4.4% improvement in the fuel efficiency of the bulldozer without compromising performance. The lock-up clutch 52 may further provide up to an additional 5-6% improvement in fuel efficiency based on estimates on the same machine.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A torque converter and torque divider assembly, comprising:
    a power source input shaft configured to receive a power source input torque from a power source;
    a torque converter including an impeller, a turbine, and a stator, the torque converter configured to receive an impeller input torque and generate a turbine output torque;
    a torque divider configured to receive the power source input torque and divide the power source input torque into at least a planetary system input torque and the impeller input torque;
    a planetary gear system configured to receive the planetary system input torque, the planetary gear system including a sun gear, a ring gear, a planet gear, and a planet carrier coupled to the planet gear;
    a stator clutch configured to selectively be locked to limit rotation of the stator and to be unlocked to allow rotation of the stator;
    a stator clutch actuator configured to activate and deactivate the stator clutch to lock the stator clutch during particular operations and to otherwise unlock the stator clutch;
    a lock-up clutch configured to lock rotating components of the torque converter and torque divider assembly; and
    an assembly output shaft.

2. The torque converter and torque divider assembly of claim 1, wherein the lock-up clutch locks rotation of the impeller to rotation of the turbine.

3. The torque converter and torque divider assembly of claim 1, wherein the turbine output torque of the turbine is input into the ring gear, the planetary system input torque is input to the sun gear, and the planet carrier is operatively connected to the assembly output shaft.

4. The torque converter and torque divider assembly of claim 1, wherein the stator clutch actuator is activated to lock the stator clutch when a torque converter speed ratio (TCR) equal to a turbine speed divided by an impeller speed is less than an acceleration stator lock maximum value.

5. The torque converter and torque divider assembly of claim 4, wherein the acceleration stator lock maximum value is equal to 0.9.

6. The torque converter and torque divider assembly of claim 1, wherein the stator clutch actuator is activated to lock the stator clutch when a torque converter speed ratio (TCR) equal to a turbine speed divided by an impeller speed is greater than a retarding stator lock minimum value.

7. The torque converter and torque divider assembly of claim 6, wherein the retarding stator lock minimum value is equal to 1.133.

8. The torque converter and torque divider assembly of claim 1, wherein the stator clutch actuator is activated to lock the stator clutch when a torque assembly speed ratio (TAR) equal to an assembly output shaft speed divided by a power source input shaft speed is less than an acceleration stator lock maximum value.

9. The torque converter and torque divider assembly of claim 1, wherein the stator clutch actuator is activated to lock the stator clutch when a torque assembly speed ratio (TAR) equal to an assembly output shaft speed divided by a power source input shaft speed is greater than a retarding stator lock minimum value.

10. A process of dividing and converting torque for operation of a vehicle or machine, comprising:
receiving a power source input torque from a power source of the vehicle or machine;
receiving an impeller input torque into a torque converter, the torque converter including an impeller, a stator, and a turbine;
dividing the power source input torque with a torque divider into at least a planetary system input torque and the impeller input torque;
receiving the planetary system input torque into a planetary gear system;
selectively locking the stator to prevent rotation of the stator during particular operations and otherwise allowing rotation of the stator;
locking rotating components of at least one of the torque converter and the torque divider; and
generating a torque output.

11. The process of claim 10, wherein the locking rotating components includes locking rotation of the impeller to rotation of the turbine.

12. The process of claim 10, further comprising inputting into a ring gear of the planetary gear system a turbine output torque of the torque converter, and inputting the planetary system input torque to a sun gear of the planetary gear system, wherein the generating the torque output includes operatively connecting a planet carrier of the planetary gear system to an assembly output shaft.

13. The process of claim 10, wherein selectively locking the stator comprises locking the stator when a torque converter speed ratio (TCR) equal to a turbine speed divided by an impeller speed is less than an acceleration stator lock maximum value.

14. The process of claim 13, wherein selectively locking the stator comprises locking the stator when the TCR is greater than a retarding stator lock minimum value.

15. The process of claim 14, wherein the acceleration stator lock maximum value is equal to 0.9 and the retarding stator lock minimum value is equal to 1.133.

16. The process of claim 10, wherein selectively locking the stator comprises locking the stator when a torque assembly speed ratio (TAR) equal to an assembly output shaft speed divided by a power source input shaft speed is less than an acceleration stator lock maximum value, and when the TAR is greater than a retarding stator lock minimum value.

17. A torque converter and torque divider assembly, comprising:
means for receiving a power source input torque from a power source;
means for receiving an impeller input torque into a torque converter means, the torque converter means including an impeller means, a stator means, and a turbine means;
means for dividing the power source input torque into at least a planetary system input torque and the impeller input torque;
means for receiving the planetary system input torque into a planetary gear system;
means for selectively locking the stator means to limit rotation of the stator means and unlocking the stator means to allow rotation of the stator means;
means for locking rotating components of the torque converter and torque divider assembly; and
means for generating a torque output.

18. The torque converter and torque divider assembly of claim 17, wherein the means for locking includes locking rotation of the impeller means to rotation of the turbine means.

19. The torque converter and torque divider assembly of claim 17, wherein the means for selectively locking the stator means locks the stator means when a torque converter speed ratio (TCR) equal to a turbine means speed divided by an impeller means speed is less than an acceleration stator lock maximum value, and when the TAR is greater than a retarding stator lock minimum value.

20. The torque converter and torque divider of claim 17, wherein the means for selectively locking the stator means locks the stator means when a torque assembly speed ratio (TAR) equal to a turbine input speed divided by a power source input torque speed is less than an acceleration stator lock maximum value, and when the TAR is greater than a retarding stator lock minimum value.

* * * * *